United States Patent
Salla (10) Patent No.: US 10,435,622 B2
(45) Date of Patent: Oct. 8, 2019

(54) ACTIVATORS FOR INORGANIC OXIDE BREAKERS

(71) Applicant: Halliburton Energy Services, Inc., Houston, TX (US)

(72) Inventor: Rajender Salla, Maharashtra (IN)

(73) Assignee: Halliburton Energy Services, Inc., Houston, TX (US)

( * ) Notice: Subject to any disclaimer, the term of this patent is extended or adjusted under 35 U.S.C. 154(b) by 269 days.

(21) Appl. No.: 15/528,714

(22) PCT Filed: Jan. 8, 2015

(86) PCT No.: PCT/US2015/010657
§ 371 (c)(1),
(2) Date: May 22, 2017

(87) PCT Pub. No.: WO2016/111692
PCT Pub. Date: Jul. 14, 2016

(65) Prior Publication Data
US 2017/0260443 A1    Sep. 14, 2017

(51) Int. Cl.
| | | |
|---|---|---|
| *E21B 43/04* | (2006.01) |
| *E21B 43/267* | (2006.01) |
| *C09K 8/68* | (2006.01) |
| *C09K 8/80* | (2006.01) |
| *C09K 8/035* | (2006.01) |
| *C09K 8/508* | (2006.01) |
| *C09K 8/512* | (2006.01) |
| *C09K 8/88* | (2006.01) |
| *C09K 8/52* | (2006.01) |
| *C09K 8/575* | (2006.01) |

(52) U.S. Cl.
CPC .............. *C09K 8/685* (2013.01); *C09K 8/035* (2013.01); *C09K 8/508* (2013.01); *C09K 8/512* (2013.01); *C09K 8/52* (2013.01); *C09K 8/5756* (2013.01); *C09K 8/68* (2013.01); *C09K 8/88* (2013.01); *C09K 8/887* (2013.01); *E21B 43/04* (2013.01); *C09K 2208/26* (2013.01); *E21B 43/267* (2013.01)

(58) Field of Classification Search
CPC ............ C09K 2208/26; C09K 2208/32; C09K 8/528; C09K 2208/20; C09K 8/805; E21B 43/267; E21B 43/26; E21B 37/06; E21B 47/1015; E21B 43/04
See application file for complete search history.

(56) References Cited

U.S. PATENT DOCUMENTS

| | | | |
|---|---|---|---|
| 4,966,723 A | 10/1990 | Hodge et al. |
| 5,686,014 A | 11/1997 | Baillely et al. |
| 5,686,401 A | 11/1997 | Willey et al. |
| 5,698,504 A | 12/1997 | Christie et al. |
| 6,143,698 A | 11/2000 | Murphey et al. |

(Continued)

FOREIGN PATENT DOCUMENTS

| | | |
|---|---|---|
| WO | 2012001396 A9 | 1/2012 |
| WO | 2014120381 A1 | 8/2014 |
| WO | 2014133853 A1 | 9/2014 |

*Primary Examiner* — Zakiya W Bates
(74) *Attorney, Agent, or Firm* — McAfee & Taft (57) ABSTRACT

Gel breaking systems comprise a source of hydrogen peroxide and an activator selected from the group consisting of triazine-based activators, phthalimide-based activators and mixtures thereof. Also, methods use the gel breaking system to break the gelled component of a treatment fluid used in a gravel packing operation for a well.

19 Claims, 2 Drawing Sheets

(56) References Cited

U.S. PATENT DOCUMENTS

| | | | |
|---|---|---|---|
| 7,712,535 | B2 | 5/2010 | Venditto et al. |
| 7,897,063 | B1 | 3/2011 | Perry et al. |
| 8,328,879 | B2 | 12/2012 | Gross et al. |
| 8,512,449 | B1 | 8/2013 | Zaid et al. |
| 2012/0325482 | A1 | 12/2012 | Salgaonkar et al. |
| 2013/0157905 | A1 | 6/2013 | Saini et al. |
| 2013/0333886 | A1 | 12/2013 | George et al. |

FIG. 2

ACTIVATORS FOR INORGANIC OXIDE BREAKERS

FIELD

The disclosure related to the field of producing crude oil or natural gas from subterranean formations. More specifically, the disclosure relates to gel breaking systems used to reduce the viscosity of well treatment fluids used in downhole operations.

BACKGROUND

To produce oil or gas from a reservoir, a well is drilled into a subterranean formation, which may be the reservoir or adjacent to the reservoir. A well includes a wellhead and at least one wellbore from the wellhead penetrating the earth. Typically, a wellbore must be drilled thousands of feet into the earth to reach a hydrocarbon-bearing formation. Generally, as the depth of the formation increases, the static pressure and temperature of the formation increases.

Well services include a wide variety of operations that may be performed in wells, such as drilling, cementing, completion, and intervention. Well services are designed to facilitate or enhance the production of desirable fluids from or through a subterranean formation. A well service usually involves introducing a well fluid, also called treatment fluid, into a well.

Drilling, completion, and intervention operations can include various types of treatments commonly performed in a wellbore or subterranean formation. For example, a treatment for fluid-loss control can be used during any of the drilling, completion, and intervention operations. During completion or intervention, stimulation is a type of treatment performed to enhance or restore the productivity of oil and gas from a well. Stimulation treatments fall into two main groups: hydraulic fracturing and matrix treatments. Fracturing treatments are performed above the fracture pressure of the subterranean formation to create or extend a highly permeable flow path between the formation and the wellbore. Matrix treatments are performed below the fracture pressure of the formation. Other types of completion or intervention treatments can include, for example, gravel packing, consolidation, and controlling excessive water production. Still other types of completion or intervention treatments include, but are not limited to, damage removal, formation isolation, wellbore cleanout, scale removal, and scale control. Of course, other well treatments and treatment fluids are known in the art.

BRIEF DESCRIPTION OF THE DRAWINGS

Implementations of the present technology will now be described, by way of example only, with reference to the attached figures, wherein.

DETAILED DESCRIPTION

The present disclosure may be understood more readily by reference to the following detailed description as well as to the examples included therein. For simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Viscosity-increasing agents, also called gelling agents, are used in wells for a variety of down-hole operations where higher viscosity are needed than is typically achieved by aqueous fluids without a viscosity-increasing agent. For example, in fracturing operations gelling agents are often used to increase the viscosity of the treatment fluid to better keep the fractures open and carry the proppant into the fractures. Also, in gravel pack operations gelled treatment fluids are used to place the gravel in the annulus between the wash pipe and casing or between the wash pipe and wellbore in uncased wells. Additionally, gelled treatment fluids are used in creating a filter cake. Typically, filter cakes are formed by placing a gelled treatment fluid down hole such that it forms a barrier on the surface in the in subsurface reservoir, such as on the wellbore wall. Often filter cakes are used to stop or reduce production of fluids from a reservoir.

After the proppant is introduced into the fractures, after the gravel is in place, or when the filter cake is no longer needed, the gelling agent is broken so that the viscosity of the fluid is reduced, thereby allowing the fluid to flow back to the surface and be recovered. This process may be referred to in the art as "breaking the fluid." The compositions or components employed to degrade the polymer can be referred to as "breakers."

Various embodiments of the present disclosure provide for gel breaking systems and methods that are capable of breaking polymers and/or gels in oil and gas operations at low temperatures, and that produce environmentally acceptable side products. The gel breaking systems are useful in operations where it is required to break gels and specifically are useful in down hole operations that require gel breaking. Such operations include, but are not limited to, fracking operations, gravel packing operations and filter cake removal.

According to various embodiments disclosed herein, there is provided a triazine-based or phthalimide-based activators that can be used in conjunction with at least one source of hydrogen peroxide in order to break gels, particularly those used in oil and gas operations. In particular, the activator and the source of hydrogen peroxide can react to produce an active oxidizer which acts to degrade the gel and results in an organic acid byproduct. The activator and the source of hydrogen peroxide can efficiently break gels at low temperatures, for example, including less than about 180° C., less than about 100° C., less than 80° C., less than 60° C., less than 40° C., and less than 30° C. Additionally, the activators disclosed herein have various other advantages over prior activators. For example, many of the activators, such as the triazine-based activators disclosed herein, work as corrosion inhibitors and sulfide scavenger. Additionally, the activators react during use to produce side products useful as pH lowering agents, scrubbers, chelating agents and corrosion inhibitors. Further, the activators disclosed herein can meet sensitive environmental regulations regarding chemical use down hole.

Other embodiments provide a gel breaking system that may include at least one source of hydrogen peroxide; and at least one activator selected from the group consisting of triazine-based or phthalimide-based activators. The gel breaking system typically is an aqueous system, and thus comprises the activator, the hydrogen peroxide source and an aqueous fluid. Suitable aqueous fluids include fresh water, salt water, brine, formation brine, seawater, or any other aqueous fluid that, preferably, does not adversely interact with the other components used in accordance with this invention or with the subterranean formation.

The source of hydrogen peroxide may be any type of hydrogen peroxide source capable of giving free hydrogen peroxide at a low temperature in aqueous solutions. Suitable hydrogen peroxide sources include organic and inorganic oxidizers, and combinations thereof. Examples of suitable hydrogen peroxide sources include peroxides, persalts, hypochlorite salts and combinations thereof.

Suitable peroxides include inorganic peroxides, organic peroxides, and combinations thereof. Examples of suitable inorganic peroxides may include hydrogen peroxide, alkali metal peroxides and alkaline earth metal peroxides. Examples of suitable alkali metal peroxides may include lithium peroxide, sodium peroxide, potassium peroxide, rubidium peroxide, cesium peroxide, francium peroxide, and combinations thereof. Examples of suitable alkaline earth metal peroxides may include magnesium peroxide, calcium peroxide, beryllium peroxide, strontium peroxide, barium peroxide, radium peroxide, and combinations thereof. Examples of suitable organic peroxides include urea-hydrogen peroxide, hydrogen peroxide, dibenzoyl peroxide, tertiarybutyl peroxide, urea peroxide, and combinations thereof.

Suitable persalts include inorganic persalts, persulfates, perborates, percarbonates, perphosphates, and combinations thereof.

Suitable persulfates include ammonium persulfate, alkali metal persulfates, alkaline earth metal persulfates, and combinations thereof. Examples of suitable alkali metal persulfates include lithium persulfate, sodium persulfate, potassium persulfate, rubidium persulfate, cesium persulfate, francium persulfate, and combinations thereof. Examples of suitable alkaline earth metal persulfates include magnesium persulfate, calcium persulfate, beryllium persulfate, strontium persulfate, barium persulfate, radium persulfate, and combinations thereof.

Suitable perborates include ammonium perborate, alkali metal perborates, alkaline earth metal perborates, and combinations thereof. Examples of suitable alkali metal perborates include lithium perborate, sodium perborate, sodium perborate monohydrate, sodium perborate tetrahydrate, potassium perborate, rubidium perborate, cesium perborate, francium perborate, and combinations thereof. Examples of suitable alkaline earth metal perborates include magnesium perborate, calcium perborate, beryllium perborate, strontium perborate, barium perborate, radium perborate, and combinations thereof.

Suitable percarbonates include alkali metal percarbonates, alkaline earth metal percarbonates, and combinations thereof. Examples of suitable alkali metal percarbonates include lithium percarbonate, sodium percarbonate, potassium percarbonate, rubidium percarbonate, cesium percarbonate, francium percarbonate, and combinations thereof.

Examples of suitable alkaline earth metal percarbonates include magnesium percarbonate, calcium percarbonate, beryllium percarbonate, strontium percarbonate, barium percarbonate, radium percarbonate, and combinations thereof.

Suitable perphosphates include alkali metal perphosphates, alkaline earth metal perphosphates, and combinations thereof. Examples of suitable alkali metal perphosphates include lithium perphosphate, sodium perphosphate, sodium pyrophosphate peroxyhydrate, potassium perphosphate, rubidium perphosphate, cesium perphosphate, francium perphosphate, and combinations thereof. Examples of suitable alkaline earth metal perphosphates include magnesium perphosphate, calcium perphosphate, beryllium perphosphate, strontium perphosphate, barium perphosphate, radium perphosphate, and combinations thereof.

Suitable hypochlorite salts include alkali metal hypochlorite salts, alkaline earth metal hypochlorite salts, and combinations thereof. Examples of suitable alkali metal hypochlorite salts include lithium hypochlorite, sodium hypochlorite, potassium hypochlorite, rubidium hypochlorite, cesium hypochlorite, francium hypochlorite, and combinations thereof. Examples of suitable alkaline earth metal hypochlorite salts include magnesium hypochlorite, calcium hypochlorite, beryllium hypochlorite, strontium hypochlorite, barium hypochlorite, radium hypochlorite, and combinations thereof.

The source of hydrogen peroxide can be present in an amount of from about 0.1 to about 99.9 weight percent based on the total weight of the gel breaking system, or from about 0.5 to about 99.5, or in the range of about 0.3% to about 7%, or in the range of from about 0.3% to about 4%. For example, the hydrogen peroxide source may be present in at least about 0.6% by weight (50 lb/Mgal) of the gel breaking system, and alternatively in the range of about 0.6% by weight (50 lb/Mgal) to about 3% by weight (250 lb/Mgal) of the gel breaking system, although much greater concentrations can be used. More generally, the hydrogen peroxide source may be present in the gel breaker compositions in a sufficient concentration to substantially reduce the viscosity of a treatment fluid or cross-linked gel or polymer.

The activator can be present in an amount of from 0.5 to 99.5 weight percent based on the total weight of the gel breaking system and more preferably in a range of about 0.001% to about 20% or from about 0.001% to about 8%. The activator can be any one or more activator selected from the group consisting of triazine-based or phthalimide-based activators.

Triazine-based activators are triazine derivatives that react with a source of hydrogen peroxide to produce peracid, also called peroxy acid.

where R can be an H, halogen, NO, alkyl, acyl, alkene, alkynyl, benzoyl or benzyl groups. The alkyl, acyl, alkene, and alkynyl groups will generally be C1-C10 straight or branched chained groups. One suitable group of triazine derivatives is represented by the formula:

where R can be an H, halogen, NO, alkyl, acyl, alkene, alkynyl, benzoyl or benzyl groups. The alkyl, acyl, alkene, and alkynyl groups will generally be C1-C10 straight or branched chained groups.

For example, suitable triazine derivatives include acetyl-2-4dioxohexahydro-1,3,5-triazine (ADHT), 1,5-Diacetyl-2,4-dioxohexahydro-1,3,5-triazine (DADHT), and 1,35-triacetyl-2,4-dioxohexahydro-1,3,5-triazine (TADHT). As an example of the production of peroxy acid, TADHT has the formula:

and TADHT produces a peroxy acid by the following reaction:

Mixtures the various suitable triazine compounds can also be used.

Phthalimide-based activators are phthalimide derivatives that react with a source of hydrogen peroxide to produce a peroxy acid, specifically a perbenzoic acid derivative. Suitable phthalimide-based activators include ones having the general formula:

where R is an H, halogen, NO, alkyl, acyl, alkene, alkynyl, benzoyl or benzyl groups. The alkyl, acyl, alkene, and alkynyl groups will generally be C1-C10 straight or branched chained groups. Phthalimide-based activators of this formula react with a peroxide source to produce a perbenzoic acid derivative of the formula:

Mixtures of the various suitable phthalimide compounds can also be used.

The peroxy acids produced act to break the gel at low temperatures and result in the production of an organic oxy acid by replacing the peroxy group (OOH group) by an oxy group (OH group). The resulting organic oxy acid can act as a competitive binder or chelater to interact with interfering metal ions from flow-back waters and produced water or which have been added as crosslinking agents. Such interfering metal ions can interfere with the gel breaking process as well as other down-hole operations. Interfering metal ions included, but are not limited to calcium, magnesium, manganese, strontium, boron, cobalt, copper, zirconium, titanium, aluminum, iron, chromium, hafnium, and the like.

The at least one activator and/or the gel breaking system described above can be used in a variety of methods, which can be useful for breaking a natural polymer or synthetic polymer (often referred to as a gel) particularly in a down-hole oil or gas operation. For example, various embodiments relate to a method that involves introducing the gel breaking system into a wellbore penetrating a subterranean formation either with or after a treatment fluid comprising a gel is added. The gel breaking system is introduced so that it interacts with the gelled treatment fluid to break the gel. In some instances, a treatment fluid containing a gelling agent is introduced down-hole and gelled once it is at a predetermined location in the wellbore or in the subterranean formation by the action of a crosslinking agent. In these instances, the gel breaking system can be added after the gelled treatment fluid is gelled down-hole. The methods according to various embodiments allow the synthetic polymer to be substantially broken within a time period of from about 1 to about 72 hours. For example, the methods according to various examples allow the synthetic polymer to be substantially broken within a time period of about 24 hours.

Suitable treatment fluids comprise a gelling agent in an aqueous fluid. Suitable aqueous fluids include fresh water, salt water, brine, formation brine, seawater, or any other aqueous fluid that, preferably, does not adversely interact with the other components used in accordance with this invention or with the subterranean formation. In some embodiments, the aqueous fluid may be present in the gelling fluids in an amount in the range from about 5% to 99.99% by volume of the gelling fluid.

Suitable gelling agents for aqueous based fluids include water-soluble polymers. Such gelling agents include natural and synthetic polymers bearing borate crosslinkable functional groups. Synthetic polymers, such as polyacrylamides and polyacrylates, can be used as the gelling agent. Natural polymers include high-molecular weight polysaccharides, such as cellulose, polysaccharides composed of mannose and galactose sugars (galactomannans), and polysaccharides composed of mannose and glucose. For example, gelling agents can include cellulose, galactomannans, diutan and xanthan and can include derivatives thereof. Of the various galactomannan gelling agents, which can be utilized, guar and guar derivatives are preferred. Guar derivatives, for example, include hydropropyl guar (HPG), carboxymethyl guar (CMG), carboxymethylhydropropyl guar (CMHPG) and hydroxyethylated guar (HEG). Cellulose derivatives, for example, include hydroxyethylcellulose (HEC), hydroxypropylcellulose (HPC), carboxymethyl cellulose (CMC) and carboxymethylhydroxyethylcellulose (CMHEC). Preferred are galactomannan gelling agents selected from the group consisting of guar, hydroxyethylguar, hydroxypropylguar, carboxymethylguar, carboxymethylhydroxyethylguar, and mixtures thereof.

Typically, the concentration of gelling agent in the aqueous fluid will depend on the desired viscosity. Often such concentrations are from about 5 lb/1000 gal of aqueous fluid to about 100 lb/1000 gal of aqueous fluid.

Gelling agents are sometimes activated by the addition of a crosslinker to the treatment fluid. Crosslinkers cause portions of the polymer or polymers comprising the gelling agent to interact with one another. Generally, the more the polymers or chemicals comprising the gelling agent interact with one another, the greater the viscosity of the treatment fluid.

Crosslinkers can be either instant or delayed crosslinkers. Instant crosslinkers tend to cause the polymers comprising the gelling agent to interact with one another quickly. Stated another way, instant crosslinkers cause a quick increase in viscosity or gelling of the treatment fluid. Typically, a substantial increase in viscosity or gelling of the treatment fluid will occur in under a minute and more typically in less than 30 seconds. Delayed crosslinkers tend to cause the polymers comprising the gelling agent to interact with one another more slowly. Depending on the delayed crosslinker, it can take on the order of a minute, several minutes or even an hour or more for a substantial increase in viscosity. With instant and delayed crosslinkers, the viscosity of the treatment fluid can be carefully controlled. Examples of instant crosslinkers include borate salts, boric acid, or boron trioxide as well as cations of zirconium, titanium aluminum, iron, magnesium as well as compounds containing boron.

Examples of delayed crosslinkers include polyhydroxyl containing compounds including glycerol, erythritol, threitol, ribitol, arabinitol, xylitol, allitol, altritol, sorbitol, mannitol, dulcitol, iditol and perseitol, zirconium-based crosslinkers, based on triethanolamine or hydroxyalkylated ethylenediamine. Although examples of instant and delayed crosslinkers have been provided, whether a particular compound acts as a delayed crosslinker or an instant crosslinker can depend on a variety of circumstances, especially the temperature of the fluid in the wellbore carrying the crosslinker.

In certain embodiments, the treatment fluids also may optionally comprise salts, pH control additives, surfactants, breakers, bactericides, fluid loss control additives, stabilizers, chelants, scale inhibitors, paraffin inhibitors, asphaltene inhibitors, mutual solvents, solvents, corrosion inhibitors, hydrate inhibitors, clay stabilizers, relative permeability modifiers (such as HPT-1™ chemical additive available from Halliburton Energy Services, Duncan, Okla.), sulfide scavengers, fibers, nanoparticles, consolidating agents (such as resins and/or tackifiers), combinations thereof, or the like.

As previously, indicated the gel breaking system can be used various down-hole operations using a gelled treatment fluid. In use, the exemplary methods and compositions disclosed herein may directly or indirectly affect one or more components or pieces of equipment associated with the preparation, delivery, recapture, recycling, reuse, and/or disposal of the disclosed compositions. For example, and with reference to FIG. 1, the disclosed methods and compositions may directly or indirectly affect one or more components or pieces of equipment associated with an exemplary gravel pack system 10, according to one or more embodiments. In certain instances, the system 10 includes a treatment fluid producing apparatus 20, a fluid source 30, a gravel source 40, and a pump and blender system 50 and resides at the surface at a well site where a well 60 is located. In certain instances, the treatment fluid producing apparatus 20 combines a gel pre-cursor or gelling agent with fluid (e.g., liquid or substantially liquid) from fluid source 30, to produce a gravel pack fluid that is used to gravel pack the formation. The gravel pack fluid can be a fluid for ready use in gravel packing the well 60 or a concentrate to which additional fluid is added prior to gravel packing of the well 60. In other instances, the gravel packing fluid producing apparatus 20 can be omitted and the gravel packing fluid sourced directly from the fluid source 30. In certain instances, the gravel packing fluid may comprise water, a hydrocarbon fluid, a polymer gel, foam, air, wet gases and/or other fluids.

Figure 1:
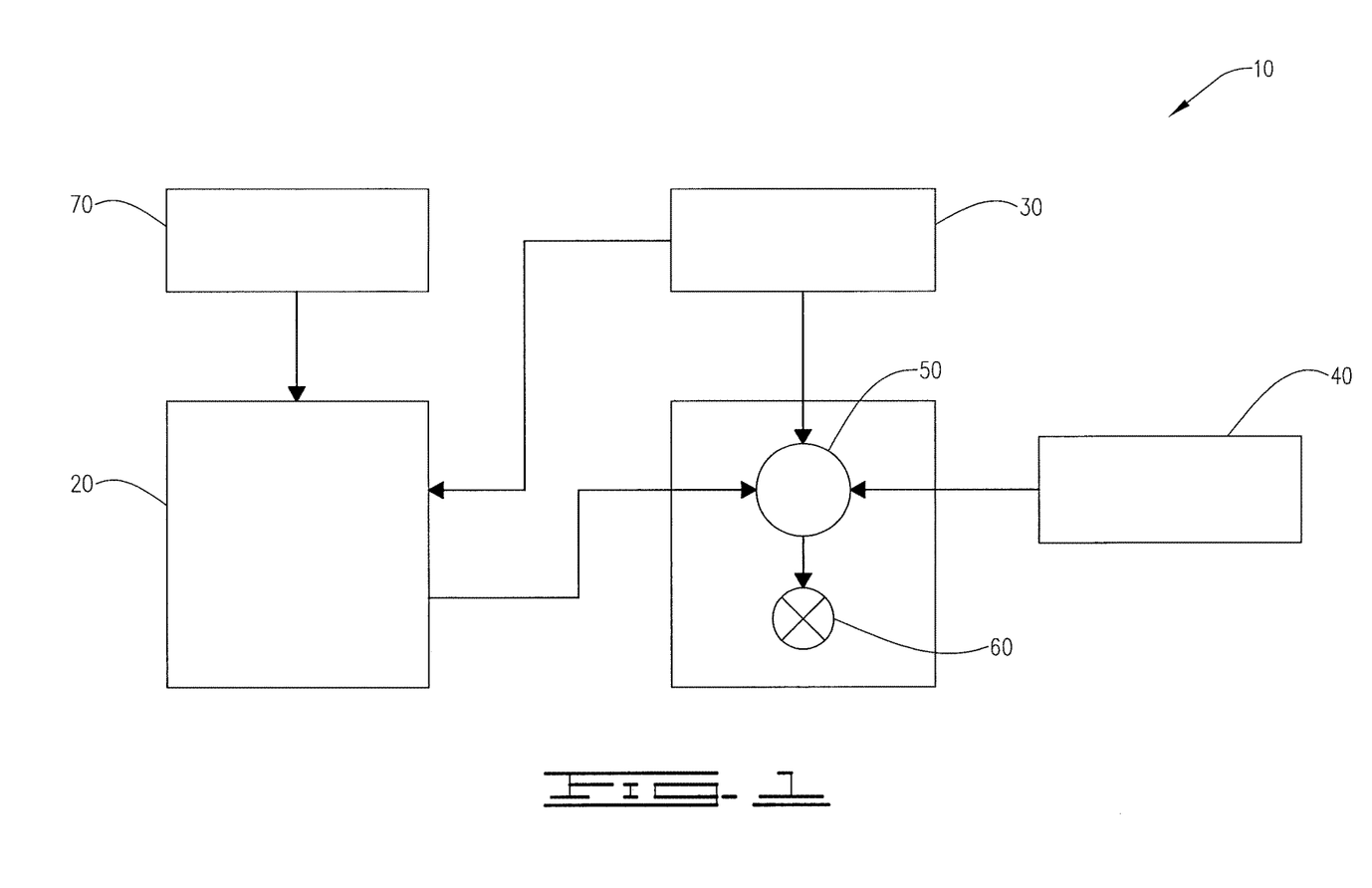
FIG. 1 is a diagram illustrating an example of a treatment fluid system that may be used in accordance with certain embodiments of the present disclosure.

The gravel source 40 can include gravel for combination with the treatment fluid. The system may also include additive source 70 that provides one or more additives (e.g., gelling agents, weighting agents, and/or other optional additives) to alter the properties of the treatment fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the treatment fluid and combines it with other components, including gravel from the gravel source 40 and/or additional fluid from the additives 70. The resulting mixture may be pumped down the well 60. Notably, in certain instances, the treatment fluid producing apparatus 20, fluid source 30, and/or gravel source 40 may be equipped with one or more metering devices (not shown) to control the flow of fluids, gravel, and/or other compositions to the pumping and blender system 50. Such metering devices may permit the pumping and blender system 50 to source from one, some or all of the different sources at a given time, and may facilitate the preparation of treatment fluids in accordance with the present disclosure using continuous mixing or "on-the-fly" methods. Thus, for example, the pumping and blender system 50 can provide just treatment fluid into the well at some times, and combinations of treatment fluid and gravel at other times.

Gravel packing is commonly used as a sand-control method to prevent production of formation sand or other fines from a poorly consolidated subterranean formation. In this context, "fines" are tiny particles, typically having a diameter of 43 microns or smaller, that have a tendency to flow through the formation with the production of hydrocarbon. The fines have a tendency to plug small pore spaces in the formation and block the flow of oil. As all the hydrocarbon is flowing from a relatively large region away from the wellbore toward a relatively small area immediately around the wellbore, the fines have a tendency to become densely packed and screen out or plug the area immediately around the wellbore. Moreover, the fines are highly abrasive and can be damaging to pumping and oilfield other equipment and operations.

Placing a relatively larger particulate near the wellbore helps filter out the sand or fine particles and prevents them from flowing into the well with the produced fluids. The primary objective is to stabilize the formation while causing minimal impairment to well productivity.

The particulate used for this purpose is referred to as "gravel." In the oil and gas field, and as used herein, the term "gravel" refers to relatively large particles in the sand size classification, that is, particles ranging in diameter from about 0.1 mm up to about 2 mm. Generally, a particulate having the properties, including chemical stability, of a low-strength proppant is used in gravel packing. An example of a commonly used gravel packing material is sand, having an appropriate particulate size range. For various purposes, the gravel particulates also may be coated with certain types of materials, including resins, tackifying agents, and the like. For example, a tackifying agent can help with fines and resins can help to enhance conductivity (e.g., fluid flow) through the gravel pack.

In one common type of gravel packing, a mechanical screen is placed in the wellbore and the surrounding annulus is packed with a particulate of a larger specific size designed to prevent the passage of formation sand or other fines. Typically, the liquid carrier fluid is returned to the surface by flowing through the screen and up a wash pipe. The gravel is deposited around the screen to form a gravel pack, which is a highly permeable allowing hydrocarbon fluid to flow easily while blocking the flow of the particulate carried in the hydrocarbon fluids. As such, gravel packs can successfully prevent the problems associated with the production of particulate materials from the formation.

It is also common, for example, to gravel pack after a fracturing procedure, and such a combined procedure is sometimes referred to as a "frac-packing."

As with placing a proppant in a subterranean formation during hydraulic fracturing, in gravel packing a viscosified fluid can be used to help transport and place the gravel in the well. A continuous aqueous phase is formed with aqueous fluid and a gelled component, such as the crosslinked gelling agents described above, to form a viscosified fluid. The viscosified fluid typically has a viscosity from 10 cP to 75 cP. The gravel is suspended in the viscosified fluid such that it can be carried down hole to the appropriate location in the borehole or the treatment zone. After the gravel is placed in the borehole, the viscosified fluid is typically broken in order to facilitate removal of the fluid.

Figure 2:
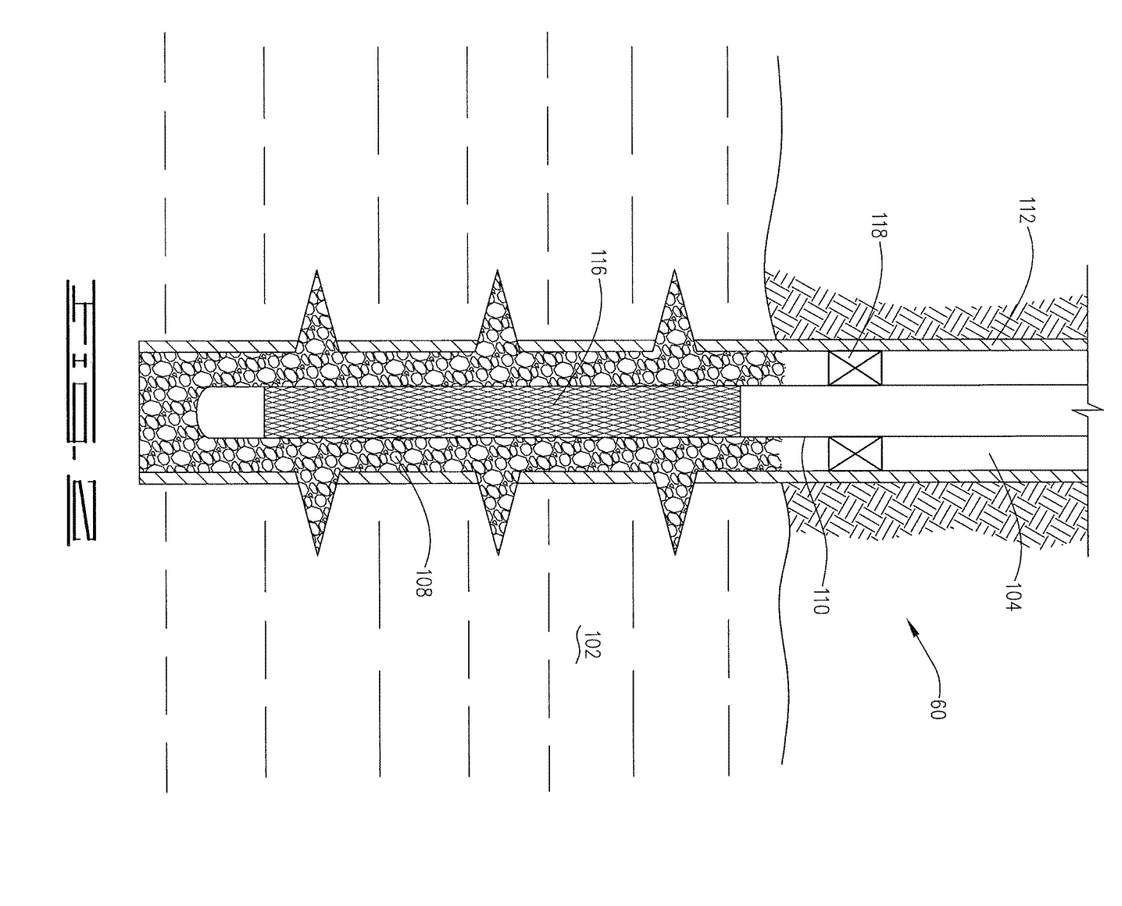
FIG. 2 is a schematic illustration of an example of a subterranean formation in which a gravel packing operation has been performed in accordance with certain embodiment of the present disclosure.

FIG. 2 shows a gravel packed well 60. The gravel packing 108 is adjacent at a portion of a subterranean formation of interest 102 surrounding a wellbore 104. The wellbore 104 extends from the surface, and gravel packing 108 has been introduced into the annulus between wash pipe 110 and casing 112 of wellbore 104. Reservoir fluids can flow into wash pipe 110 through screen 116 but the gravel packing is retained in the annulus by screen 116. Although shown as vertical, the wellbore 104 may include horizontal, vertical, slant, curved, and other types of wellbore geometries and orientations, and the gravel packing may be applied to any portion of the wellbore. The wellbore 104 can include a casing 112 that is cemented or otherwise secured to the wellbore wall. The wellbore 104 can be uncased or include uncased sections. Perforations can be formed in the casing 112 to allow reservoir fluids to flow into the borehole 104. In cased wells, perforations can be formed using shape charges, a perforating gun, hydro-jetting and/or other tools.

The gravel is often introduced down-hole in a gelled treatment fluid through annulus 108. The pump and blender system 50 can be coupled to the well to pump the gravel/treatment fluid into the wellbore 104. After the gravel is in place, the gelled treatment fluid is broken to facilitate its removal through wash pipe 110. A packer 118 is anchored and sealed in annulus 108 above the gravel pack to prevent reservoir fluids and gravel from traveling up annulus 108.

The wash pipe 110 is part of a work string, which may include coiled tubing, jointed pipe, and/or other structures that allow fluid flow. The working string can include flow control devices, bypass valves, ports, and or other tools or well devices that control a flow of fluid through the interior of the working string.

The working string and/or the wellbore 104 may include one or more sets of packers 118 that seal the annulus between the working string and wellbore 104 to define an interval of the wellbore 104 in which the gravel is retained. Thus, the work string can have a packer up-hole of the gravel pack and can have a packer down-hole of the gravel pack. FIG. 2 shows one packer 118 defining an up-hole boundary of the interval.

While not specifically illustrated herein, the disclosed methods and compositions may also directly or indirectly affect any transport or delivery equipment used to convey the compositions to the gravel packing system 10 such as, for example, any transport vessels, conduits, pipelines, trucks, tubulars, and/or pipes used to fluidically move the compositions from one location to another, any pumps, compressors, or motors used to drive the compositions into motion, any valves or related joints used to regulate the pressure or flow rate of the compositions, and any sensors (i.e., pressure and temperature), gauges, and/or combinations thereof, and the like.

In accordance with the above disclosure, several embodiments will now be described. In some embodiments, a gel breaking system comprises a source of hydrogen peroxide and an activator. The activator is selected from the group consisting of triazine-based activators, phthalimide-based activators and mixtures thereof. In some of these embodiments, the gel breaking system comprises or consists essentially of the activator, the source of hydrogen peroxide and an aqueous fluid.

The source of hydrogen peroxide can be selected from the group consisting of a peroxide, a persalt, a hypochlorite salt and combinations thereof. The source of hydrogen peroxide can be present in amount of from about 0.3% to about 7% weight percent based on the total weight of the gel breaking system. The activator can be present in an amount of from about 0.001% to about 20% weight percent based on the total weight of the gel breaking system.

Further, the triazine-based activator can be a triazine derivative that reacts with a source of hydrogen peroxide to produce a peracid. More specifically, the triazine-based activator is a triazine derivative represented by the formula:

where R can be an H, halogen, NO, alkyl, acyl, alkene, alkynyl, benzoyl or benzyl groups and the alkyl, acyl, alkene, and alkynyl groups will generally be C1-C10 straight or branched chained groups.

The phthalimide-based activator can be a phthalimide derivative that reacts with a source of hydrogen peroxide to produce a perbenzoic acid. More specifically, the phthalimide-based activator can be phthalimide derivative having the formula:

where R is an H, halogen, NO, alkyl, acyl, alkene, alkynyl, benzoyl or benzyl groups and the alkyl, acyl, alkene, and alkynyl groups will generally be C1-C10 straight or branched chained groups.

In another embodiment, there is a well treatment fluid comprising an aqueous fluid, and a gel breaking system per one of the embodiments described above. The gelled component is a crosslinked natural polymer.

In still another embodiment, there is a method of gravel packing a treatment zone of a well. The method comprising the steps of:
a. forming a treatment fluid comprising a continuous aqueous phase and gravel, wherein the continuous aqueous phase comprises:
  an aqueous fluid; and
  a gelled component;
b. introducing the treatment fluid into a treatment zone of the well; and
c. introducing a gel breaking system per one of the embodiments described above into said treatment fluid.

The well can have a temperature at the treatment zone of less than about 180° C. or less than about 60° C. The continuous phase can have a viscosity from 10 cP to 75 cP.

Additionally, the treatment fluid can be introduced into the well using one or more pumps. The components of the treatment fluid can be mixed using a blender system.

Therefore, the present invention is well adapted to attain the ends and advantages mentioned, as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present invention. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. The term "about" generally refers to a range of numbers that one of skill in the art would consider equivalent to the recited value (i.e., having the same function or result). In many instances, the term "about" may include numbers that are rounded to the nearest significant figure. Also, the terms in the claims have their plain, ordinary meaning unless otherwise explicitly and clearly defined by the patentee.

What is claimed is:

1. A gel breaking system comprising:
   a source of hydrogen peroxide;
   an activator selected from the group consisting of triazine-based activators, phthalimide-based activators and mixtures thereof, wherein the triazine-based activator is a triazine derivative that reacts with a source of hydrogen peroxide to produce a peracid and the phthalimide-based activator is a phthalimide derivative that reacts with a source of hydrogen peroxide to produce a perbenzoic acid.

2. The gel breaking system according to claim 1, wherein the source of hydrogen peroxide is one selected from the group consisting of a peroxide, a persalt, a perborate, a hypochlorite salt and combinations thereof.

3. The gel breaking system according to claim 1, wherein the source of hydrogen peroxide is present in an amount of from about 0.3% to about 7% weight percent based on the total weight of the gel breaking system.

4. The gel breaking system according to claim 1, wherein the activator is present in an amount of from about 0.001% to about 20% weight percent based on the total weight of the gel breaking system.

5. The gel breaking system according to claim 1 where the triazine-based activator is a triazine derivative represented by the formula:

where R can be an H, halogen, NO, alkyl, acyl, alkene, alkynyl, benzoyl or benzyl groups and the alkyl, acyl, alkene, and alkynyl groups will generally be C1-C10 straight or branched chained groups; and wherein the phthalimide-based activator is a phthalimide derivative having the formula:

where R is an H, halogen, NO, alkyl, acyl, alkene, alkynyl, benzoyl or benzyl groups and the alkyl, acyl, alkene, and alkynyl groups will generally be C1-C10 straight or branched chained groups.

6. A well treatment fluid comprising:
an aqueous fluid;
a gelled component;
a source of hydrogen peroxide; and
an activator selected from the group consisting of triazine-based activators, phthalimide-based activators and mixtures thereof, wherein the triazine-based activator is a triazine derivative that reacts with a source of hydrogen peroxide to produce a peracid and the phthalimide-based activator is a phthalimide derivative that reacts with a source of hydrogen peroxide to produce a perbenzoic acid.

7. The well treatment fluid according to claim 6, wherein the gelled component is a crosslinked natural polymer.

8. The well treatment fluid according to claim 7, wherein the source of hydrogen peroxide is one selected from the group consisting of a peroxide, a persalt, a hypochlorite salt and combinations thereof.

9. The well treatment fluid according to claim 8 where the triazine-based activator is a triazine derivative represented by the formula:

where R can be an H, halogen, NO, alkyl, acyl, alkene, alkynyl, benzoyl or benzyl groups and the alkyl, acyl, alkene, and alkynyl groups will generally be C1-C10 straight or branched chained groups; and wherein the phthalimide-based activator is a phthalimide derivative having the formula:

where R is an H, halogen, NO, alkyl, acyl, alkene, alkynyl, benzoyl or benzyl groups and the alkyl, acyl, alkene, and alkynyl groups will generally be C1-C10 straight or branched chained groups.

10. A method of gravel packing a treatment zone of a well, the method comprising the steps of:

a. forming a treatment fluid comprising a continuous aqueous phase and gravel, wherein the continuous aqueous phase comprises:
an aqueous fluid; and
a gelled component;

b. introducing the treatment fluid into a treatment zone of the well; and c. introducing a gel breaking system into said treatment fluid, wherein the gel breaking system comprises a source of hydrogen peroxide, and an activator selected from the group consisting of triazine-based activators, phthalimide-based activators and mixtures thereof.

11. The method according to claim 10, wherein the well has a temperature at the treatment zone of less than about 180° C.

12. The method according to claim 10, wherein the well has a temperature at the treatment zone of less than about 60° C.

13. The method according to claim 10, wherein the continuous phase has a viscosity from 10 cP to 75 cP.

14. The method according to claim 10, wherein the treatment fluid is introduced into the well using one or more pumps.

15. The method according to claim 10, wherein the components of the treatment fluid are mixed using a blender system.

16. The method according to claim 10, wherein the source of hydrogen peroxide and the activator react to produce a peroxy acid, and wherein the peroxy acid acts to gel break the viscosity-increasing agent resulting in an oxy organic acid, which acts to suppress interference metals during flow back.

17. The method according to claim 10, wherein the source of hydrogen peroxide is one selected from the group consisting of a peroxide, a persalt, a hypochlorite salt and combinations thereof.

18. The method according to claim 10, wherein the triazine-based activator is a triazine derivative that reacts with a source of hydrogen peroxide to produce a peracid and the phthalimide-based activator is a phthalimide derivative that reacts with a source of hydrogen peroxide to produce a perbenzoic acid.

19. The method according to claim 10, where the triazine-based activator is a triazine derivative represented by the formula:

where R can be an H, halogen, NO, alkyl, acyl, alkene, alkynyl, benzoyl or benzyl groups and the alkyl, acyl, alkene, and alkynyl groups will generally be C1-C10 straight or branched chained groups; and wherein the phthalimide-based activator is a phthalimide derivative having the formula:

where R is an H, halogen, NO, alkyl, acyl, alkene, alkynyl, benzoyl or benzyl groups and the alkyl, acyl, alkene, and alkynyl groups will generally be C1-C10 straight or branched chained groups.

\* \* \* \* \*